(12) United States Patent
Shekokar et al.

(10) Patent No.: US 7,738,469 B1
(45) Date of Patent: Jun. 15, 2010

(54) MULTI-VIRTUAL SERVICE MODULE PINHOLE OR CONNECTION CLASS OFFLOAD

(75) Inventors: Praveen Shekokar, Pune (IN); Manoj Sharma, Sunnyvale, CA (US); Badari Narayana, Santa Clara, CA (US); Ratnarekha Singamsetty, San Jose, CA (US); Mahesh Kumar, San Ramon, CA (US)

(73) Assignee: Radware Ltd., Tel-Aviv (IL)

( * ) Notice: Subject to any disclaimer, the term of this patent is extended or adjusted under 35 U.S.C. 154(b) by 178 days.

(21) Appl. No.: 12/132,988

(22) Filed: Jun. 4, 2008

Related U.S. Application Data

(60) Provisional application No. 60/941,709, filed on Jun. 4, 2007.

(51) Int. Cl.
H04L 12/28 (2006.01)

(52) U.S. Cl. .................. 370/401; 370/392; 709/226
(58) Field of Classification Search .................. None
See application file for complete search history.

(56) References Cited

U.S. PATENT DOCUMENTS

| 7,240,325 B2 * | 7/2007 | Keller | 717/104 |
| 2003/0212776 A1 * | 11/2003 | Roberts et al. | 709/223 |

* cited by examiner

*Primary Examiner*—Duc C Ho
(74) *Attorney, Agent, or Firm*—Katten Muchin Rosenman LLP

(57) ABSTRACT

In a communications network, a virtual rack having service modules for performing network services is provided. A pinhole that corresponds to a plurality of the service modules is created. Data packets are directed to a service processor in response to matching the data packets to the pinhole. For connection class offload, using the acceleration processor to match the connection class pinhole to the data packets and creating connection class sessions that are used for processing subsequent packets of the connection.

19 Claims, 4 Drawing Sheets

| | SIP | SPORT | DIP | DPORT | PROTOCOL |
|---|---|---|---|---|---|
| 402 CLIENT | 16.16.16.100 | 1024 | 16.16.16.101 | 21 | TCP |
| | | | | | |
| 404 FW | 16.16.16.100 | 1024 | 16.16.16.101 | 21 | TCP |
| 406 PINHOLE | 16.16.16.101 | ANY | IP | PORT | TCP |
| 408 | | | | | |
| SLB | 16.16.16.100 | 1024 | 17.17.17.100 | 21 | TCP |
| 410 PINHOLE | 17.17.17.100 | ANY | IP | PORT | TCP |
| 412 | | | | | |
| SERVER | 16.16.16.100 | 1024 | 17.17.17.100 | 21 | TCP |
| 414 FW | 17.17.17.100 | ANY | IP | PORT | TCP |
| 416 SLB | 17.17.17.100 | ANY | IP | PORT | TCP |
| 418 PINHOLE | 17.17.17.100 | ANY | IP | PORT | TCP |

MULTI-VIRTUAL SERVICE MODULE PINHOLE OR CONNECTION CLASS OFFLOAD

CROSS-REFERENCE TO RELATED APPLICATIONS

This claims the benefit under 35 U.S.C. §119(e) of U.S. Provisional Application Ser. No. 60/941,709, entitled "Multi-VSM Connection Class Offload/Multi-VSM Hole Programming," filed Jun. 4, 2007, which is hereby incorporated by reference.

TECHNICAL FIELD

The invention relates generally to creating pinholes to enable packets of multiple virtual service modules to be directed to a particular processor and/or performing connection class offload spanning multiple virtual service modules.

BACKGROUND

Various different types of network services can be provided by network equipment deployed in networks of service providers. Network equipment can perform network services such as switching, routing, firewall protection, load balancing, and so forth. Traditionally, such network services have been performed by actual physical equipment, such as switches, routers, and so forth.

With improvements in processor technology, processors can be abstracted and partitioned to provide virtual network service modules that perform various network services, such as those listed above. By virtualizing hardware including processors, network services can be implemented as distinct software modules on top of a virtualization layer. This makes it possible to create virtual network topologies inside a particular hardware.

In some implementations, the virtual network service modules can be implemented within virtual entities referred to as "virtual racks," which represent the virtualizations of physical network appliances or devices that are mounted and cabled within a network equipment rack in a data center, for example. The virtual network service modules of a virtual rack may be involved in a session in which packets are communicated in both a forward direction (forward flow) and a reverse direction (reverse flow). If the packets of such a session are not processed efficiently, such as processed by different service processors, then system inefficiency or even failure can occur.

SUMMARY

In general, according to an embodiment, a method for use in a communications network includes providing a virtual rack having service modules for performing network services, and creating a pinhole that corresponds to a plurality of the service modules. Data packets are directed to a service processor in response to matching the data packets to the pinhole. Also, in some embodiments, a connection class can be defined that includes plural sessions associated with the virtual rack, where the connection class can be offloaded.

Other or alternative features will become apparent from the following description, from the drawings, and from the claims.

DETAILED DESCRIPTION

Figure 1:
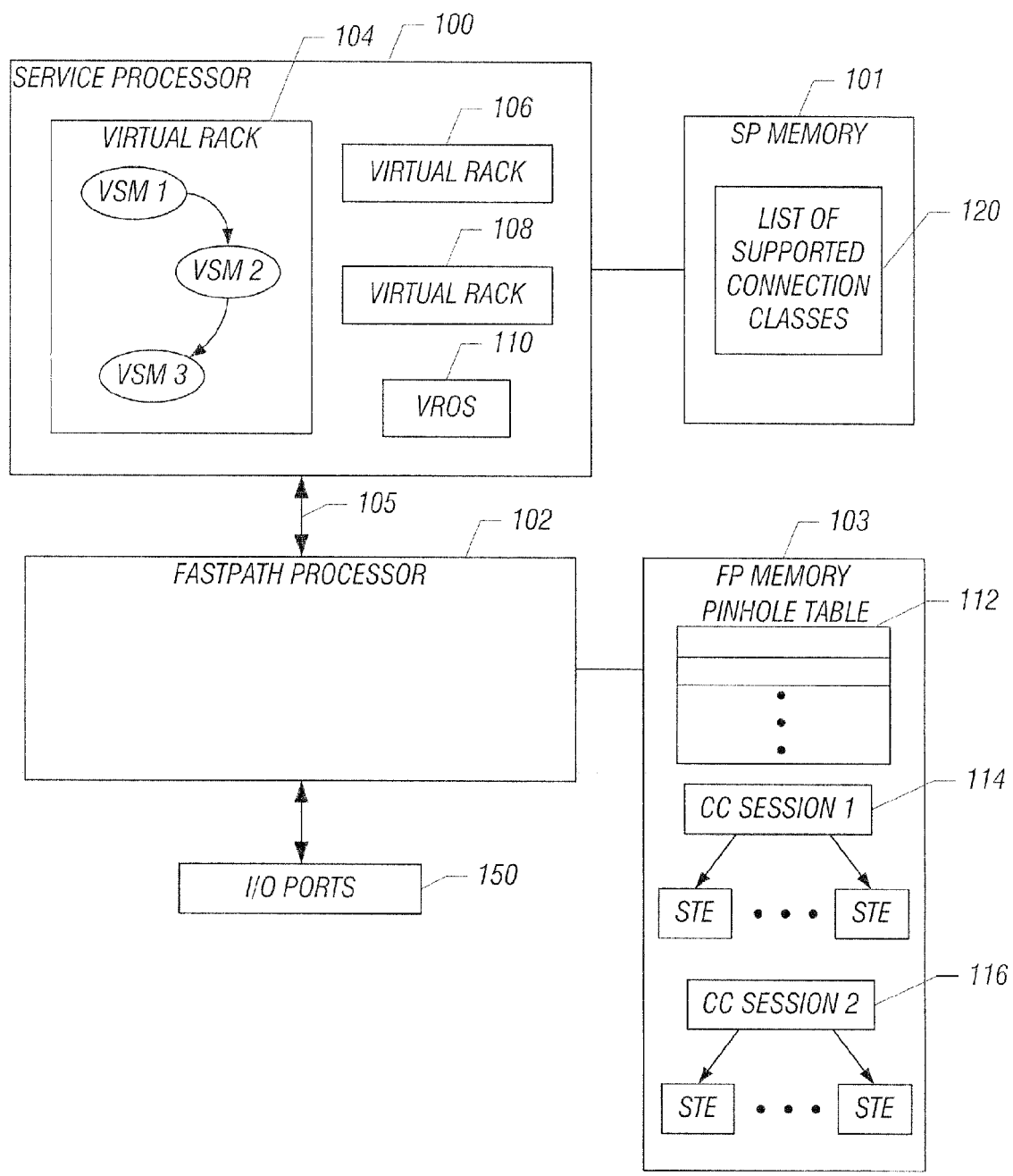
FIG. 1 is a block diagram of an exemplary system that includes virtual racks and virtual service modules (VSMs) in the virtual racks, in accordance with an embodiment.

In the following description, numerous details are set forth to provide an understanding of some embodiments. However, it will be understood by those skilled in the art that some embodiments may be practiced without these details and that numerous variations or modifications from the described embodiments may be possible.

In accordance with some embodiments, a network arrangement includes "virtual racks" that include corresponding virtual service modules (VSMs) for performing corresponding network services. A "virtual rack" is a software process that has one or more modules to provide one or more corresponding network services, such as switching services, network routing services, firewall protection services, load balancing services, and so forth. A virtual rack can also be considered a software container for grouping zero or more modules (that are connected in a particular order) for performing corresponding network services to simulate a physical rack of a network system. Virtual racks can represent the virtualization of physical network appliances or devices that are mounted and cabled within a network equipment rack in a data center, for example. Generally, a "virtual rack" refers to a software component that virtualizes or simulates a physical arrangement (e.g., a rack, a switch, a router device, etc.), with the virtual rack including zero or more modules for performing network services. Each virtual rack and the VSMs contained in the virtual rack can be configured to the desired configuration, such as to provide a desired amount of bandwidth and resources.

A VSM represents a functional block to perform a network service. For example, a VSM can virtualize a physical board that is plugged into a rack of a backplane of a real physical network system, or some other physical module. A virtual service module is a software entity that provides the same functionality and operation as a real device providing the equivalent service. In a real device the functionality is tied to the physical device where as a VSM a dynamically configurable module that can be instantiated by the customer with in the context of a virtual rack to provide the desired functionality. Examples of VSM include server load balancer (SLB) VSM, firewall VSM, secure socket layer (SSL) VSM, intelligent traffic manager (ITM) VSM, intrusion prevention system (IPS) VSM, and so forth. The VSMs can be interconnected in some specified order to form a service chain that behaves as a chain of physical network devices.

In accordance with some embodiments, to improve performance of the network arrangement that includes virtual racks with VSMs, pinholes can be defined to represent groups of VSMs or a connection class. The pinhole can then be offloaded from a service processor to an acceleration processor for improved performance. A service processor refers to the processor on which the VSMs (and other software, such as the virtual rack operating system) are executed. The acceleration processor is a high-performance processor (which can have higher performance than the service processor) to enable for faster processing of packets associated with established data flows.

A data flow (or more simply "flow") is a directed transfer of information from one application running on one network device (also referred to as "endpoint of a flow") to another application running on another network device. The flow is identified by a combination of five network parameters referred to as a 5-tuple. The 5 parameters include source IP (Internet Protocol) address (SIP), destination IP address (DIP), source port (SP), destination port (DP), and protocol.

A pair of flows between two endpoints that work together to achieve required transfer of data is called a connection (or "session"). The flow associated with the first packet of a connection received from an endpoint, by convention, is called the forward flow. The flow in the reverse direction is called the reverse flow.

In certain situations a network device may anticipate a flow or group of flows and thus may want to deal with them in a specific manner when packets belonging to any of the flows are received by the network device. Examples include establishment of FTP (file transfer protocol) or SIP (session initiation protocol) sessions. An FTP session or SIP session involves first exchanging flows of control packets (FTP control packets or SIP control packets) to set up the FTP or SIP session, followed by establishing a bearer path for communicating bearer traffic. A network device that has detected FTP or SIP control packets will anticipate that there will be packets for communication in the FTP or SIP bearer path. It may be desirable to process such bearer path packets in a desired manner.

A flow can be specified with a partial tuple (a 5-tuple in which some of the fields of the five-tuple have unknown values). A 4-tuple contains 4 known fields and the remaining field is a wildcard. A 3-tuple contains 3 known fields and the remaining two fields are wildcards. Similarly a 2-tuple contains 2 known fields and the remaining fields are wildcards. Note that there can be multiple types of 4-tuples, 3-tuples, and 2-tuples based on which fields are known and which are wildcards. For example, assuming a 5-tuple {field1, field2, field3, field4, field5), then a first type of 4-tuple would have known values for fields field1, field2, field4, and field5, but a wildcard for field3. A second type of 4-tuple would have known values fields field2, field3, field4, and field5, but a wildcard for field1.

A tuple with one or more wildcard fields is also called a pinhole. A "pinhole" is used to allow specific packets (that have fields matching corresponding known fields of a 4-tuple, 3-tuple, or 2-tuple) to be forwarded to a particular service processor.

When a network device processes a connection, typically with the processing of the first or first few packets, the network device can determine what processing the network device needs to perform to the remainder packets in both forward and reverse directions. The determination of what processing is needed is performed at a service processor. To improve performance, the service processor can choose to offload the determined processing of subsequent packets to an acceleration processor, if one exists. The acceleration processor is also referred to as a fastpath processor (FP). Note that there can be multiple service processors and fastpath processors in a network arrangement.

As part of this offload, the service processor can offload a forward flow table entry (FFTE) and a reverse flow table entry (RFTE) that are used to identify the packet belonging to the forward and reverse flows, respectively. Further, the service processor also offloads a session table entry (STE) that tracks the state and history of the session as well as specifies the operations to be performed on the packet in the forward and reverse directions. These operations can be specified in terms of a sequence of actions (action list). There is one action list for the forward direction, and one action list for the reverse direction. The act of offloading (forward and reverse) flow table entries and session table entries is referred to as "session setup."

When all the packets are transferred through the forward and reverse flows of a particular session, the particular session can be removed by deleting corresponding FTEs and STE (a procedure referred to as session delete). The advantage of doing connection offload to an acceleration processor is higher performance in terms of more packets processed per second.

As depicted in FIG. 1, a service processor (SP) 100 and fastpath processor (FP) 102 are shown. The service processor 100 is associated with its memory 101 (SP memory), and the fastpath processor 102 is associated with its memory 103 (FP memory). The service processor 100 and fastpath processor 102 can be interconnected by a relatively high-speed link 105, such as a PCI-X bus, in one example. The fastpath processor 102 is further connected by input/output (I/O) ports 150 to communicate data packets.

A number of virtual racks 104, 106, and 108 and a virtual rack operating system (VROS) 110 are executed on the service processor 100. The virtual rack 104 has three virtual service modules VSM1, VSM2, and VSM3. The other virtual racks 106 and 108 can similarly contain virtual service modules.

In some embodiments, plural ones of the VSMs VSM1, VSM2, and VSM3 may contain application level gateways (ALGs), which provide proxy services for the associated VSMs. The ALGs typically inspect the control connection of a protocol like FTP and SIP and determine the other related connections that are anticipated. Since multiple VSMs contain ALGs, it would be desirable in this context to have related connections processed at the same service processor.

In accordance with some embodiments, a pinhole is created for two major reasons: (1) to direct packets matching the pinhole to a specified processor (that has some prior state and information to continue processing subsequent packets); and (2) to perform connection class offload.

When multiple VSMs are present in a virtual rack (such as multiple VSMs VSM1, VSM2, and VSM3 in virtual rack 104 of FIG. 1), each VSM makes its pinhole offload decision independent of other VSMs in the virtual rack. If a VSM offloads a pinhole to ensure packets matching the pinhole are processed at a specific service processor, then the offloaded pinholes are to be evaluated and in certain cases modified based on what pinholes are offloaded by other VSMs as well as which VSMs are present before and after a particular VSM.

The offloaded pinhole can be a normalized pinhole that covers the individual pinholes individually created by the VSMs in the virtual rack.

In one example, multiple VSMs of a virtual rack may create different tuples that are for the same application protocol (e.g., FTP, SIP, or some other protocol). The different tuples may be caused by network address translation (in which a source or destination address is changed as it progresses from one network to another). These different individual pinholes should be part of the same group for a given session that triggered the pinholes. As a result, a single group pinhole will be created for the group to be offloaded to the fastpath processor 104.

As noted above, another type of pinhole offload that can be performed according to some embodiments is connection class offload in the presence of multiple VSMs. For a given VSM, it may be possible to know a priori the way to perform session setup for a group of connections. Such a group of connections can be identified by a 4-tuple, 3-tuple, or 2-tuple, and is called a connection class. The process of offloading the session setup associated with a group of connections is called connection class offload. Once the connection class is offloaded, the fastpath processor would perform session setup whenever it receives a new flow packet matching the connection class. Subsequent packets belonging to that session would also be processed by the fastpath processor. When the packet processing for a session completes, session deletion would be performed. A benefit of performing connection class offload is higher performance in terms of more connections processed per second.

In case of connection class offload in the presence of multiple VSMs, it is ensured that the pinhole defining the connection class is an intersection of all the pinholes offloaded by each VSM and further that each VSM has specified what operation it wants to be performed for that connection class. Thus a pinhole that overlaps pinhole from all the VSMs is offloaded. Further the fastpath processor maintains a session for that connection class ("connection class session"). The connection class session contains high level actions for each VSM that participates in that connection class offload. Each high level action would address the operations that have to be performed as part of the session setup for each new flow matching that connection class. Note that each VSM only specifies the operations to be performed as part of the session setup from its perspective. In accordance with some embodiments, high level actions for each participating VSM can be added to the connection class session STE.

As depicted in FIG. 1, pinholes offloaded to the fastpath processor 102 are stored in a pinhole table 112 in the FP memory 103. Each entry of the pinhole table 112 corresponds to a respective pinhole. For entries of the pinhole table 112 that correspond to pinholes representing offloaded connection classes, such pinhole table entries identify a respective connection class session (e.g., connection class session x 114, connection class session y 116, etc.) also stored in the FP memory 103, which contains information identifying actions to take to process connections matching the respective connection class.

Also depicted in FIG. 1 is a list of supported connection classes 120 stored in the SP memory 101. The list of supported connection classes 120 includes the connection classes created by VSMs and offloaded to the fastpath processor 102.

Figures 2, 4:
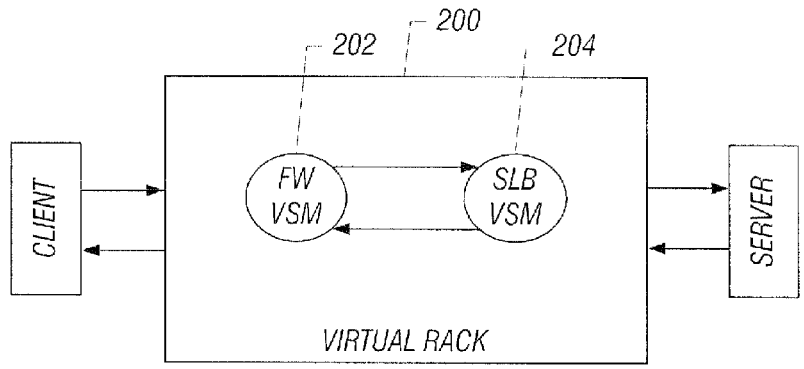
FIG. 2 is a block diagram of a service chain between a client and a server.
FIG. 4 illustrates an example of normalizing pinhole tuples and grouping such pinhole tuples to create a multi-VSM pinhole.

FIG. 2 depicts an exemplary network and service chain configuration that includes a client (e.g., an FTP client) that wishes to establish a session (e.g., an FTP session) with a server (e.g., FTP server). The service chain includes a firewall VSM 202 and a server load balancing VSM 204 that are part of a virtual rack 200. There may be other VSMs, which are omitted for purposes of clarity. In the example, the client has IP address 16.16.16.100, and the server has IP address 17.17.17.100.

In the context of the FIG. 2 arrangement, a flow for selecting a pinhole to download is described with reference to FIGS. 3 and 4. In processing a packet in a service chain made up of multiple VSMs (that are part of a virtual rack), individual pinholes are created (at 302) by individual VSMs. For example, FIG. 4 shows 5-tuples associated with the following components of FIG. 2: client, firewall VSM, SLB VSM, and server. A 5-tuple 402 in the packet that exits the client has values for the source IP (SIP) field, source port (SPORT) field, destination IP (DIP) field, destination port (DPORT) field, and protocol field. The SIP field in the 5-tuple 402 contains the source IP address of the client, and the DIP field in the 5-tuple 402 contains the destination IP address of the virtual rack.

A 5-tuple 404 contains values of corresponding fields of a packet that exits the firewall VSM. A pinhole tuple 406 is created by the firewall VSM. A 5-tuple 408 contains values of corresponding fields of a packet that exits the SLB VSM, and the SLB VSM creates pinhole tuple 410. A 5-tuple 412 contains values of corresponding fields of a packet that enters the server.

Figure 3:
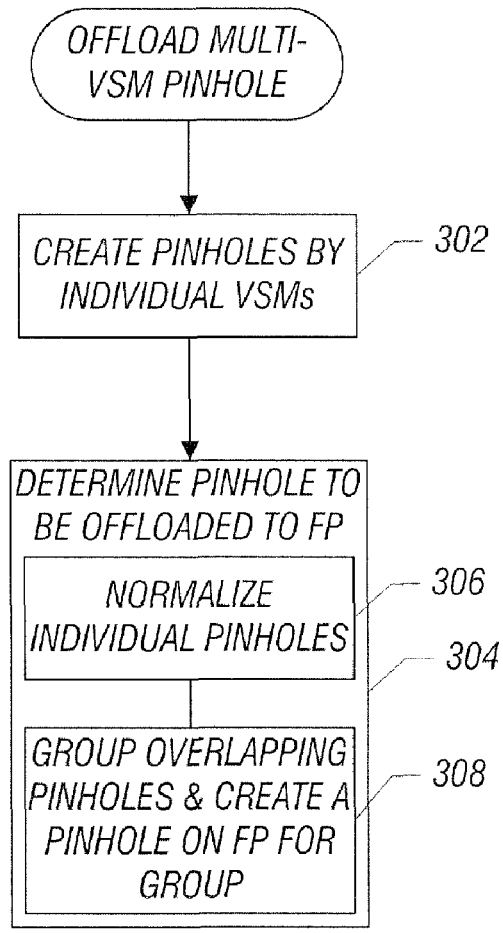
FIG. 3 is a flow diagram of a process of offloading a multi-VSM pinhole for a group of VSMs to an acceleration processor, according to an embodiment.

As depicted in FIG. 3, once all VSMs in the service chain are done with processing of the packet, the VROS 110 determines (at 304) the pinhole to be offloaded to the fastpath processor 104. To determine the pinhole to be offloaded, the VROS 110 normalizes (at 306) the pinhole tuples created by the VSMs. An example of the normalizing is depicted in FIG. 4, which shows normalizing of the pinhole tuple 406 created by the firewall VSM to create the normalized pinhole tuple 414. The SIP field in the normalized pinhole tuple 414 has been modified from the pinhole tuple 406 (SIP has been changed from 16.16.16.101 to 17.17.17.100, which is the address of the server).

The pinhole tuple 410 created by the SLB VSM has been normalized to pinhole tuple 416. In this example, the normalized pinhole tuple 416 is the same as the original pinhole tuple 410 created by the SLB VSM.

Normalizing a pinhole tuple can be according to the following. If an anticipated connection direction on the pinhole is the same as the parent session's forward flow direction, then the tuple stored in the FFTE is used to normalize the pinhole tuple, such as by replacing the SIP field of the pinhole tuple with the SIP field of the tuple in the FFTE. However, if the anticipated connection direction on the pinhole is the same as the parent session's reverse flow direction, then the tuple stored in the RFTE is used to normalize the pinhole tuple. For example, the SIP field of the pinhole tuple is replaced with the SIP field of the tuple stored in the RFTE. The above merely provided one example of normalizing—in other implementations, other ways of normalizing a pinhole tuple can be employed.

As further depicted in FIG. 3, after normalizing the pinhole tuples created by the VSMs in the service chain, the VROS 110 groups (at 308) overlapping pinholes and creates a pinhole on the fastpath processor 102 for this group. In the example of FIG. 4, the grouped pinhole tuple is indicated as 418.

Figure 5:
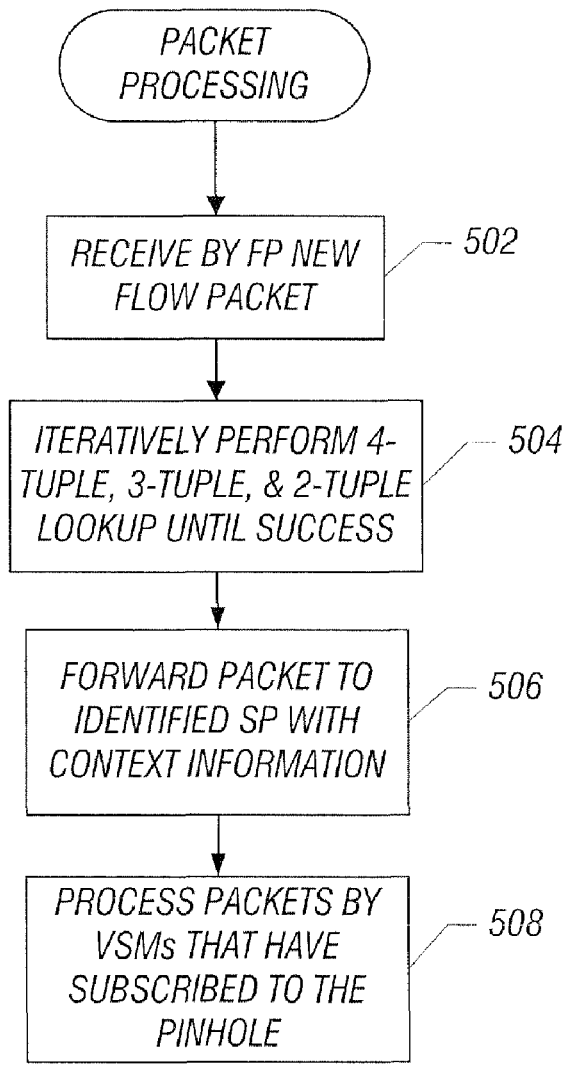
FIG. 5 is a flow diagram of a process of processing a packet that matches a multi-VSM pinhole, according to an embodiment.

FIG. 5 illustrates a process of processing a packet for a new flow. Upon the fastpath processor 102 receiving (at 502) the new flow packet, the fastpath processor 102 iteratively performs (at 504) 4-tuple, 3-tuple, and 2-tuple lookup until a successful lookup is achieved. In other words, the fastpath processor 102 attempts to perform a 4-tuple lookup (to match the corresponding five fields of the received packet with the respective five fields of a pinhole tuple). If that fails, then the fastpath processor 102 proceeds to perform a 3-tuple lookup, and then to perform a 2-tuple lookup.

If any of the lookups results in a success, then the fastpath processor 102 forwards (at 506) the received packet to the identified service processor 100 (from among multiple service processors) and sends context information to the service processor 100. The VSMs running on the service processor 100 that have subscribed to the matching pinhole tuple then processes (at 508) the received packet.

Figures 6, 7:
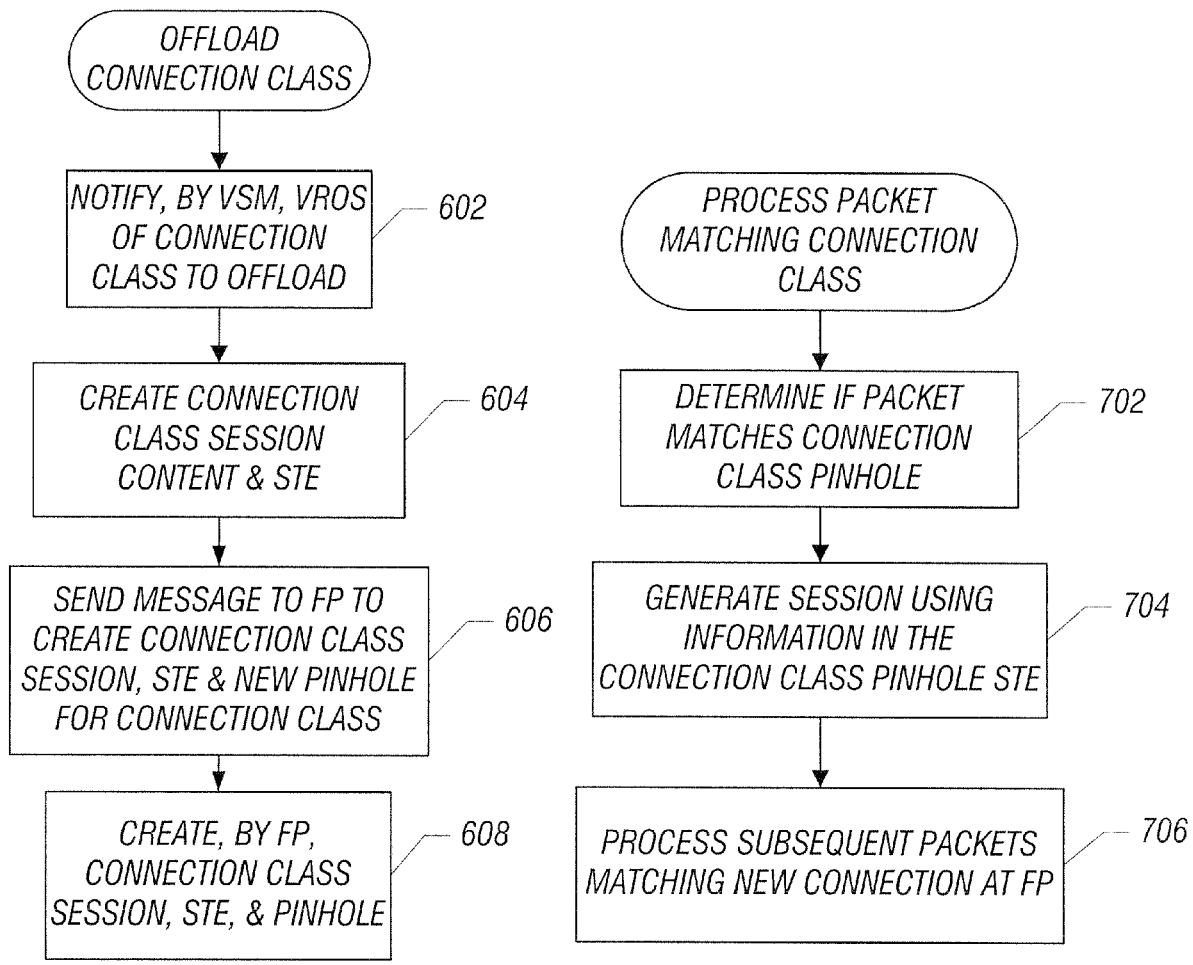
FIG. 6 is a flow diagram of a process of offloading a connection class to an acceleration processor, according to an embodiment.
FIG. 7 is a flow diagram of a process of processing a packet that matches a connection class pinhole, according to an embodiment.

FIG. 6 shows a process of offloading a connection class. Certain VSMs, such as firewall and SLB VSMs, are able to offload a connection class (in the form of a group pinhole) to a fastpath processor. As discussed above, the object of offloading the connection class pinhole is to allow the fastpath processor itself to create sessions for the connections that match the connection class pinhole. Normally, connections are offloaded by the service processor for each connection after processing one or more initial packets for the connection. When a VSM has a connection class the VSM wishes to offload, the VSM notifies (at 602) the VROS 110 of the connection class to offload. The VSM provides the following information to the VROS 110: pinhole and an identifier of the VSM.

In response, the VROS 110 then creates (at 604) the following information: connection class session content, and the connection class offload session table entry (STE) for the connection class. Next, the VROS 110 sends (at 606) a message to the fastpath processor 102 to create the connection class session, the connection class offload STE, and to create the pinhole for the connection class.

In response, the fastpath processor 110 creates (at 608) the connection class session (e.g., 114 or 116 in FIG. 1), the corresponding connection class STE, and a new pinhole for the connection class (which is added to the pinhole table 112 in FIG. 1). The new pinhole can be a group pinhole that is an intersection of pinholes created by multiple VSMs. Similar to the process described above in connection with FIG. 3, creating the group pinhole includes normalizing the individual pinholes of the VSMs, and then grouping overlapping normalized individual pinholes to provide the group pinhole.

FIG. 7 is a flow diagram of processing a received packet to determine if the packet matches a connection class pinhole. Upon receiving a packet, the fastpath processor 102 determines if the received packet matches (at 702) a connection class pinhole. If so, the FP generates (at 704) a connection class session using the information contained in the connection class pinhole STE (the STE that was offloaded for the connection class pinhole). This new session contains the RFTE, FFTE and STE. Subsequent packets matching the new connection (session) are processed (at 706) by the fastpath processor. Essentially the connection class pinhole processing mimics the service processor action of generating a session that is offloaded to the FP.

Next, information of the respective connection class session is retrieved by the fastpath processor 102 and used to process (at 706) the packet. Processing the packet involves performing VSM specific functions at the fastpath processor 102.

Instructions of such software are executed on the processor. The processor includes microprocessors, microcontrollers, processor modules or subsystems (including one or more microprocessors or microcontrollers), or other control or computing devices. A "processor" can refer to a single component or to plural components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a communications network, comprising:
   providing a virtual rack having service modules for performing network services;
   creating a pinhole that corresponds to a plurality of the service modules;
   directing data packets to a service processor in response to matching the data packets to the pinhole, wherein creating the pinhole that corresponds to the plurality of service modules comprises:
   receiving individual pinholes created by respective ones of the plurality of service modules;
   normalizing the individual pinholes; and
   generating the pinhole that corresponds to the plurality of service modules according to the normalized individual pinholes.

2. The method of claim 1, further comprising:
   offloading the pinhole to an acceleration processor;
   the acceleration processor receiving the data packets and performing the matching, and in response to performing the matching, forwarding the data packets to the service processor.

3. The method of claim 1, wherein normalizing the individual pinholes comprises modifying at least one field of at least some of the individual pinholes.

4. The method of claim 1, wherein directing the data packets to the service processor in response to matching the data packets to the pinhole comprises directing the data packets to the service processor that is selected from multiple service processors.

5. The method of claim 1, further comprising:
   defining a connection class that includes plural sessions associated with the service modules of the virtual rack;
   creating a second pinhole representing the connection class;
   offloading the connection class to an accelerator processor.

6. The method of claim 5, wherein creating the second pinhole comprises:
   receiving individual pinholes from the corresponding service modules of the virtual rack;
   normalizing the individual pinholes,
   wherein the second pinhole is created according to the normalized individual pinholes.

7. The method of claim 5, wherein offloading the connection class to the accelerator processor comprises the service processor offloading the connection class to the accelerator processor.

8. The method of claim 1, wherein the pinhole is represented as a tuple having at least one field that is set equal to a wildcard value.

9. The method of claim 8, wherein the tuple includes a source Internet Protocol (IP) address field, a source port field, a destination IP address field, a destination port field, and a protocol field.

10. The method of claim 1, wherein at least two of the service modules in the virtual rack contain respective application level gateways.

11. A method for use in a communications network, comprising:
providing a virtual rack having service modules for performing network services;
creating a pinhole that corresponds to a plurality of the service modules;
directing data packets to a service processor in response to matching the data packets to the pinhole;
defining a connection class that includes plural sessions associated with the service modules of the virtual rack;
creating a second pinhole representing the connection class;
offloading the connection class to an accelerator processor; and
the accelerator processor performing session setup according to further received data packets that match the connection class using information for the connection class that contains high level actions for the service modules.

12. A system comprising:
a service processor;
an accelerator processor;
a virtual rack having plural virtual service modules executable on the service processor to perform respective network services, wherein each of the plural virtual service modules are configured to create individual pinholes;
software executable on the service processor to generate a group pinhole for the plural virtual service modules, and to offload the group pinhole to the accelerator processor, wherein generating the group pinhole that corresponds to the plural virtual service modules comprises:
receiving the individual pinholes created by respective ones of the plural virtual service modules;
normalizing the individual pinholes; and
generating the group pinhole that corresponds to the plural virtual service modules according to the normalized individual pinholes.

13. The system of claim 12, wherein the accelerator processor is configured to:
receive a data packet;
match fields of the data packet to the group pinhole; and
in response to matching the fields of the data packet to the group pinhole, direct the data packet to the service processor.

14. The system of claim 13, further comprising a plurality of service processors, wherein the data packet is directed to one of the plurality of service processors.

15. The system of claim 12, wherein the group pinhole is represented by a partially completed tuple in which at least one field is a wildcard.

16. The system of claim 15, wherein the partially completed tuple comprises a source Internet Protocol (IP) address field, a source port field, a destination IP address field, a destination port field, and a protocol field.

17. The system of claim 12, wherein the software comprises an operating system.

18. A computer-readable storage medium containing instructions that when executed cause a system to:
provide a virtual rack having a plurality of virtual service modules that are executable on a service processor;
offload a connection class represented by a pinhole tuple from the service processor to an accelerator processor, wherein the pinhole tuple is a group pinhole generated based on individual pinholes of multiple ones of the virtual service modules; and
perform tasks at the accelerator processor according to information associated with the connection class, in response to subsequently received data packets, wherein generating the group pinhole that corresponds to the plurality of virtual service modules comprises:
receiving the individual pinholes created by respective ones of the plurality of virtual service modules;
normalizing the individual pinholes; and
generating the group pinhole that corresponds to the plurality of virtual service modules according to the normalized individual pinholes.

19. The computer-readable storage medium of claim 18, wherein the connection class identifies a group of connections.

* * * * *